United States Patent
Melby et al.

[11] Patent Number: 5,850,579
[45] Date of Patent: Dec. 15, 1998

[54] PAN/TILT SUPPORT WITH CONCENTRIC DRIVE SHAFTS

[75] Inventors: Gordon M. Melby, Blaine; Paul Cobian, Woodbury, both of Minn.

[73] Assignee: ADDCO, Inc., St. Paul, Minn.

[21] Appl. No.: 871,496

[22] Filed: Jun. 9, 1997

[51] Int. Cl.⁶ .................................................. G03B 29/00
[52] U.S. Cl. .......................................... 396/427; 396/428
[58] Field of Search ................................... 396/419, 427, 396/428; 352/243; 348/143, 144, 149, 212, 213, 214

[56] References Cited

U.S. PATENT DOCUMENTS

| | | |
|---|---|---|
| 4,123,782 | 10/1978 | Kitahara et al. . |
| 4,225,886 | 9/1980 | Smith . |
| 4,314,278 | 2/1982 | Smith . |
| 4,321,625 | 3/1982 | Smith . |
| 4,369,467 | 1/1983 | Smith . |
| 4,543,609 | 9/1985 | Smith . |
| 4,974,088 | 11/1990 | Sasaki . |
| 5,159,368 | 10/1992 | Zemlen ................................. 396/427 |
| 5,471,296 | 11/1995 | Parker et al. . |
| 5,627,616 | 5/1997 | Sergeant et al. ..................... 396/427 |

*Primary Examiner*—Howard B. Blankenship
*Attorney, Agent, or Firm*—Palmatier, Sjoquist, Voigt & Christensen, P.A.

[57] ABSTRACT

A pan/tilt device consists of a pan motor and a tilt motor on a motor mount structure, a camera mount structure rotatable by the pan motor about the pan axis, a camera bracket on the camera mount structure rotatable by the tilt motor along the tilt axis. A pair of concentric drive shafts extend from the motor mount structure to the camera mount structure to accomplish the pan and tilt functions. The pan/tilt device is capable of remote operation over a computer network.

20 Claims, 7 Drawing Sheets

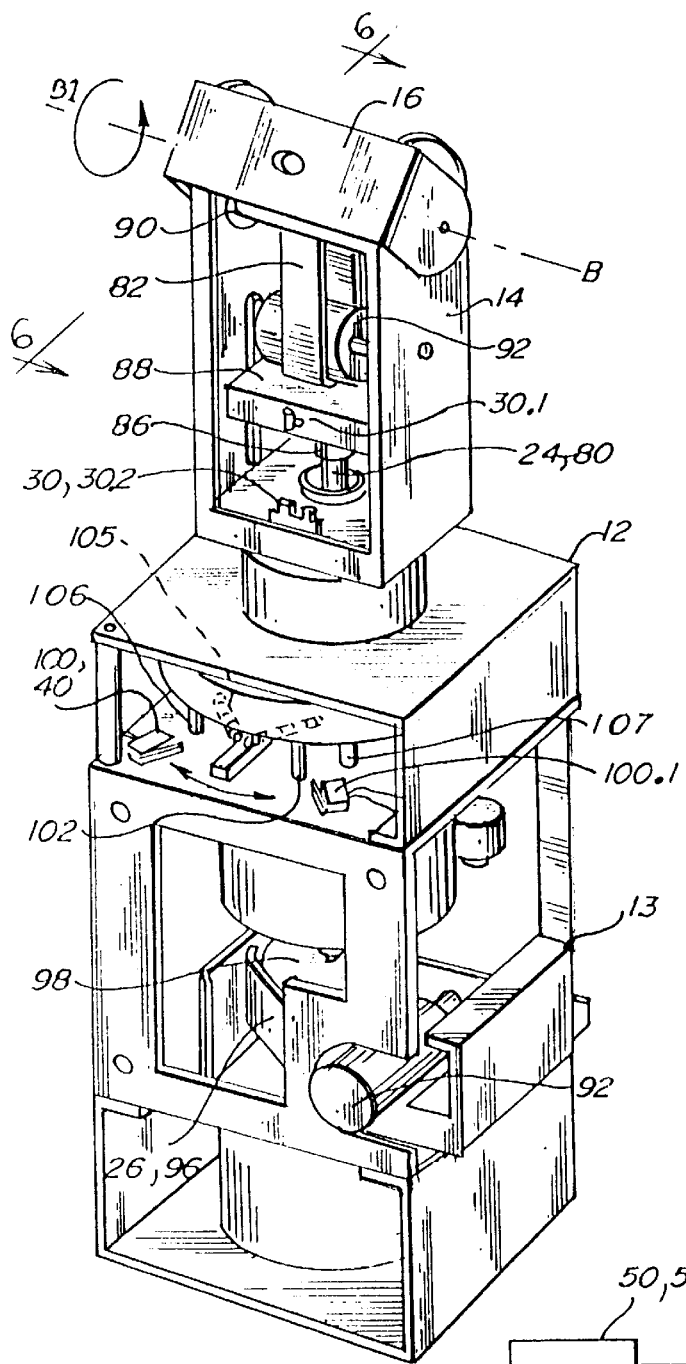
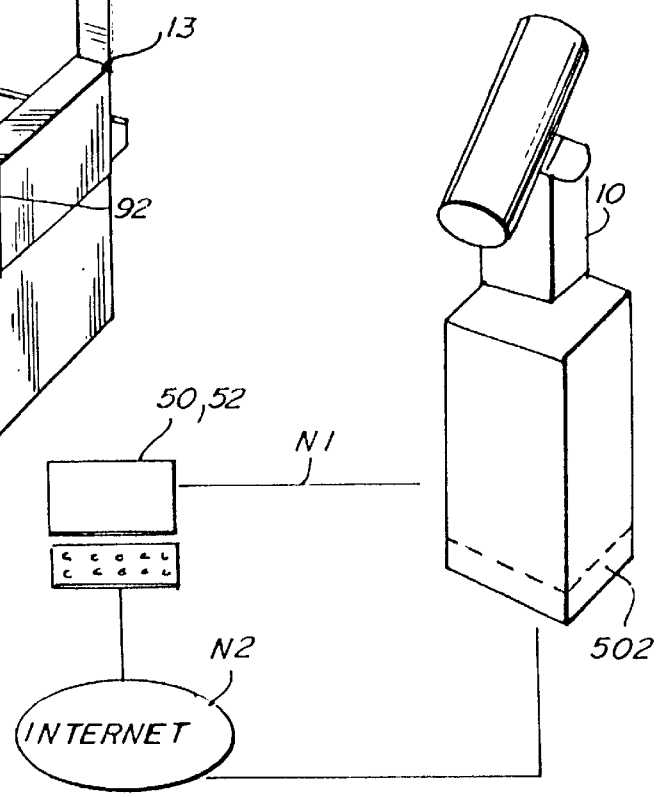
Fig. 2.
Fig. 5.

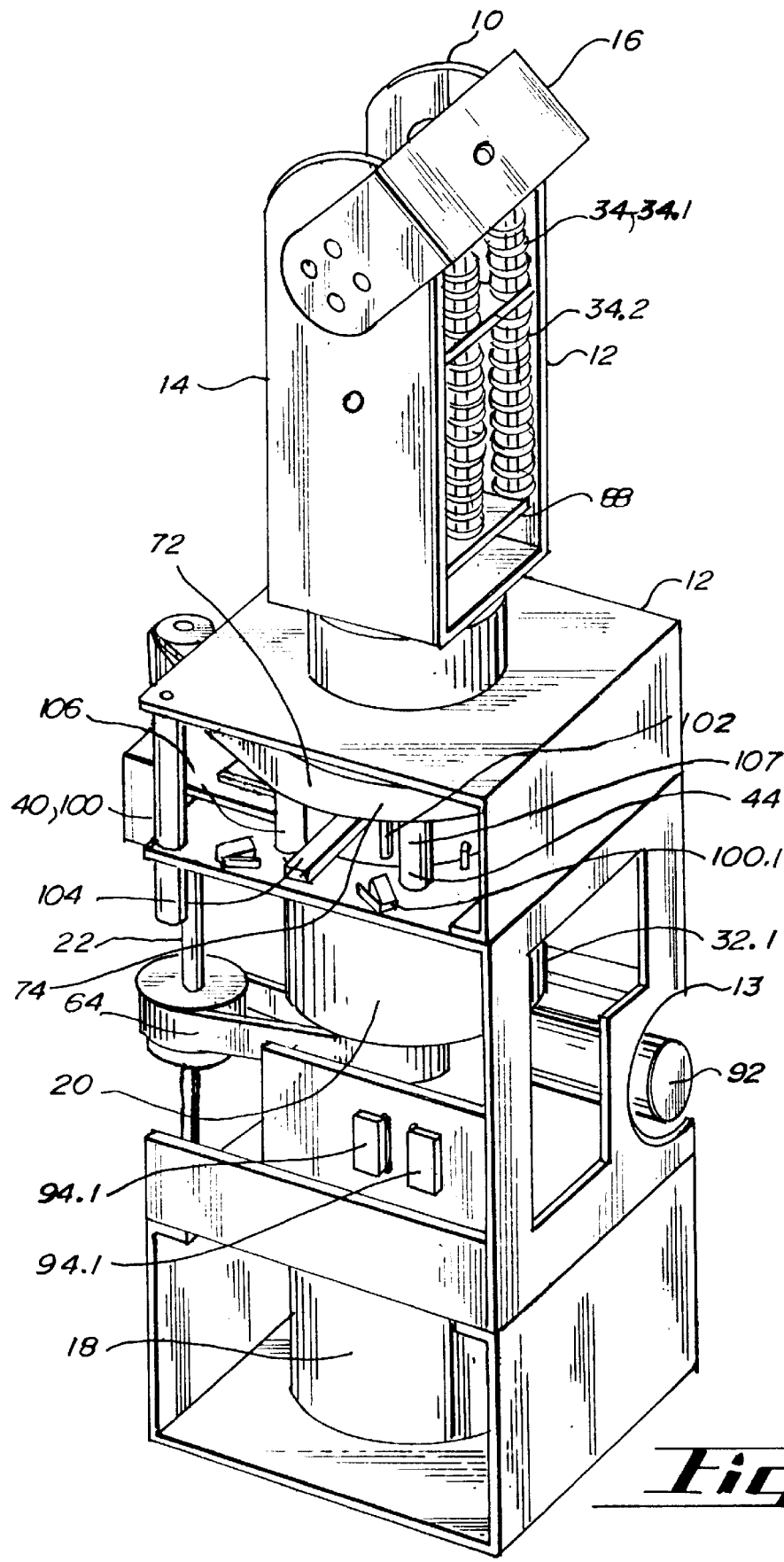

PAN/TILT SUPPORT WITH CONCENTRIC DRIVE SHAFTS

BACKGROUND OF THE INVENTION

The present invention is a pan/tilt device for a camera, such as a video camera.

Pan/tilt devices for cameras exist, ranging from a simple camera tripod mount which allows the camera to be moved in two directions, to more complex systems. The word "pan" is defined in Webster's Ninth New Collegiate dictionary as "to rotate (as a motion-picture camera) so as to keep an object in the picture or secure a panoramic effect." More specifically, "panning" a camera generally refers to motion of the camera about a substantially vertical axis, thereby moving the camera in a substantially horizontal plane. However, it should be understood that panning may also refer to motion about an axis which is substantially offset from the vertical. Pan/tilt devices generally have a second axis of motion, substantially perpendicular to the first axis, called "tilting". Generally speaking, "tilting" refers to motion of the camera about a substantially horizontal axis in a substantially vertical plane.

In certain applications, such as highway traffic management, video cameras are used to obtain a variety of views. For example, the operator of a traffic management center must be able to select a particular video camera then pan and tilt the camera to view an accident (probably zooming the camera lens in also). After viewing the accident, the operator must be able to return the video camera to a general surveillance mode of the area. This requires a pan/tilt device that is capable of remote operation, such as over a computer network. Additionally, the pan/tilt device must be capable of automatic operation.

In automatic operation, a computer remotely located from the video camera may be used to view a particular segment of roadway. Programming within the computer may be used, for example, to count the number of automobiles traversing that segment in a particular time interval, thereby deriving an indication of traffic conditions. These types of applications are termed "machine vision". The computer may be programmed to alert an operator if the traffic flow rate falls below a predetermined threshold. The operator may then select that particular video camera and may wish to pan, tilt, and zoom the camera to view an accident occurring near the camera. After the operator has finished with the camera, it is important that the camera be returned to automatic operation. This requires that the coordinates of the roadway segment be known in advance and that the camera position away from these coordinates be known at all times. The computer may then issue a command to the pan/tilt device to return the camera to viewing the roadway segment.

It is therefore essential that a camera "pan home" position be defined along the pan axis of motion and a "tilt home" position be defined along the tilt axis of motion. The pan/tilt device must be capable of sensing the pan home position and tilt home position, and then position itself at the pan home position and tilt home position as a reference point. The pan/tilt device must be capable of precisely measuring camera pan position away from the pan home position and camera tilt position away from the tilt home position.

Either an encoder or a stepper motor may be used to precisely determine pan position and tilt position. For various reasons, stepper motors are preferred. However, stepper motors have the disadvantage that they have low holding torque when not energized. Power must therefore be continuously supplied to the stepper motors in order to hold the camera in a given pan position and tilt position. This is ordinarily not a problem when the camera is used at a fixed location where a continuous electrical supply is available. However, in traffic management systems it is necessary to set up cameras at a variety of remote locations. In such instances, the pan/tilt device must be powered by a battery or by solar energy, and it is inadvisable to continuously power the stepper motors. Therefore, the pan/tilt device should have mechanisms for holding the camera at a particular pan position and tilt position when the stepper motor is not energized. For example, a brake may be used on the pan stepper motor. Obviously, such a mechanism must be capable of being activated and deactivated from a remote location.

There should also be limiters for limiting the tilt position and pan position. In order to allow most flexible operation, the pan position limiter should allow the camera to be panned more than 360 degrees from the pan home position. This would allow an operator, for example, to move the camera to view an accident just beyond 360 degrees from the pan home position without reversing pan direction and moving the camera back through 360 degrees.

Ideally, the pan/tilt device should present a slim configuration for mounting on support devices such as towers. Therefore, an important feature of a pan/tilt device is having the pan motor and tilt motor aligned along the pan axis. Additionally, rapid motion of the camera is best achieved when there is as little weight as possible in the camera mount. Therefore, the pan motor and tilt motor should be mounted below the camera mount.

Additionally, the cameras and enclosures utilized for outdoor highway monitoring typically weigh 15 to 20 pounds. The pan/tilt device must be robust enough to handle this weight with minimal maintenance.

In such a configuration, a good way of moving the camera along the tilt axis is a lead screw and a lead nut moving along the lead screw along the pan axis. This arrangement is more compact than, for example, an arrangement of pulleys. However, in such a configuration panning of the camera may cause rotation of the lead nut along the lead screw, resulting in unintended tilt. A correction mechanism is important to offset such unintended tilt.

SUMMARY OF THE INVENTION

A pan/tilt device which satisfies many of the requirements listed under the Background of the Invention consists of a pan motor; a tilt motor; a camera mount structure rotatable by the pan motor along the pan axis; a camera bracket on the camera mount rotatable by the tilt motor along the tilt axis; a pan drive brake for holding the camera at a pan position; a mechanism for precisely measuring the camera pan position and camera tilt position; and a camera positioning mechanism for automatically positioning the camera at any tilt position and any pan position. The pan/tilt device should be capable of remote operation over a computer network and should be capable of automatic operation.

An object and advantage of the present invention is that it presents a slim configuration, with the pan and tilt motors stacked below the camera mount structure, allowing rapid movement of the camera mount structure because the heavy components are not moved during the pan/tilt operation. This allows a lighter overall structure, electric motors with lesser power requirements.

An object and advantage of the present invention is that it is capable of precisely measuring camera pan position away from pan home position and camera tilt position away from tilt home position.

Another object and advantage of the present invention is that it is capable of automatically returning to a given pan position and tilt position.

Another object and advantage of the invention is that it provides a high level of accuracy in the pan/tilt positioning. This is of particular importance in allowing the device to precisely return to a particular location which is critical for machine vision applications.

Another object and advantage of the present invention is that it may be remotely operated over a computer network.

Another object and advantage of the present invention is that it includes mechanisms for holding the camera in a given pan position and tilt position without the use of electrical power, as in operation at remote sites by battery or solar power.

BRIEF DESCRIPTION OF THE DRAWINGS

FIG. 2 is a detailed perspective view of the pan/tilt device of the present invention.

FIG. 3 is a detailed perspective view of the pan/tilt device of the present invention.

FIG. 5 is a schematic of a computer network with the pan/tilt device remotely controlled.

DETAILED DESCRIPTION OF THE PREFERRED EMBODIMENTS

Figure 1:
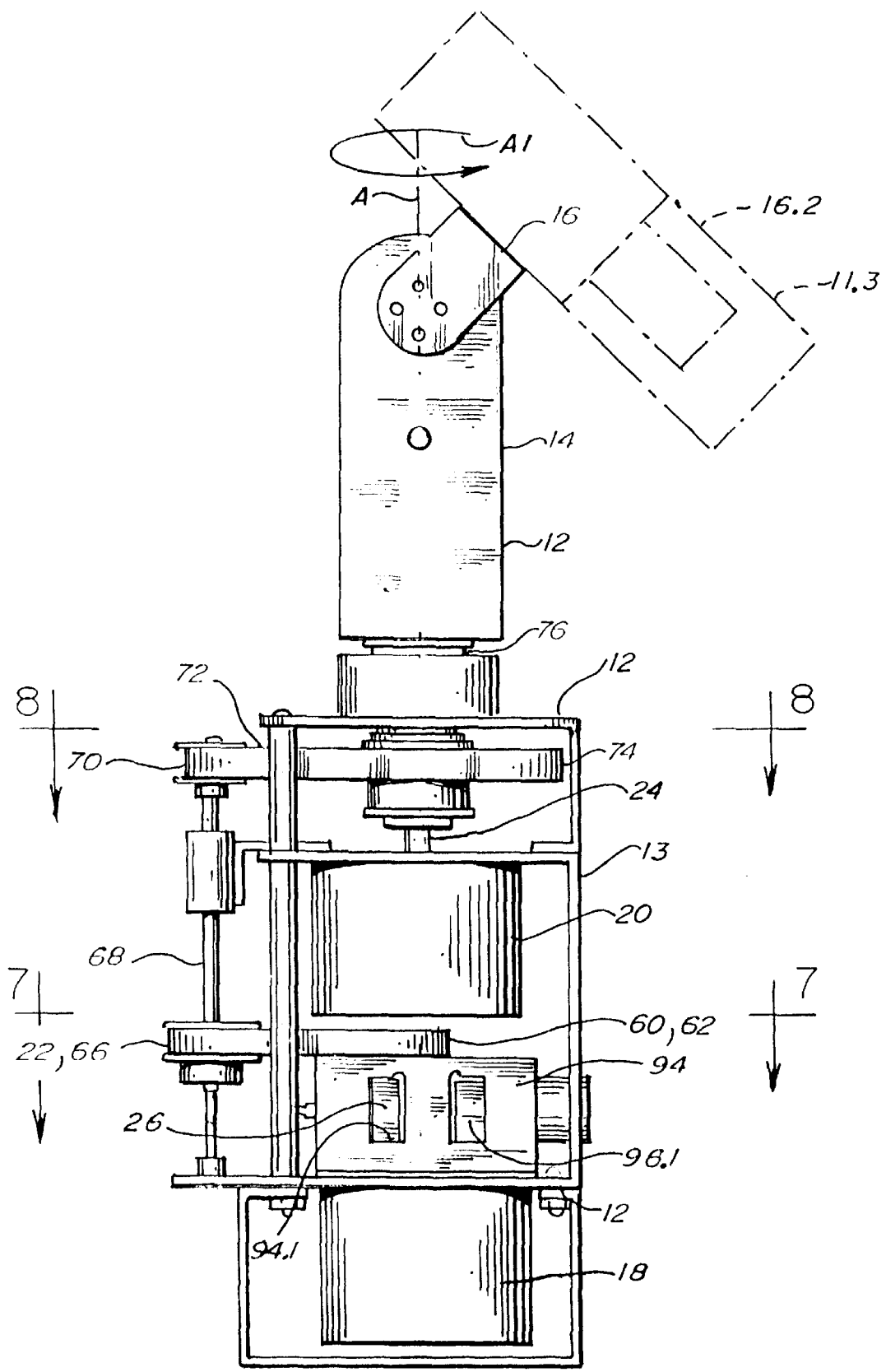
FIG. 1 is an elevational view of the pan/tilt device of the present invention.
Figure 4:
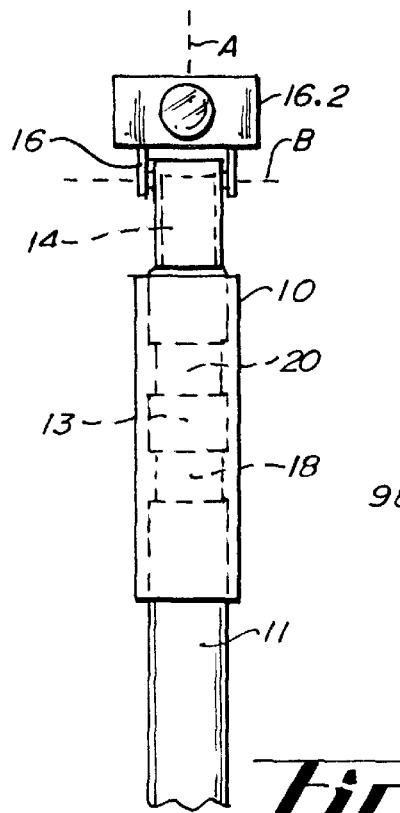
FIG. 4 is an elevational view of a pan/tilt device with camera mounted on a pole.

Referring to FIGS. 1, 2, 3, and 4, a preferred embodiment of the device is portrayed. In highway surveillance applications the device will typically be mounted on a pole 11 as shown in FIG. 4.

The pan/tilt device of the present invention is shown generally in the Figures as reference numeral 10.

The pan/tilt device 10 comprises a housing 11.5 which contains a support frame 12. The support frame 12 has a first axis A, which is also known as the pan axis. The support frame 12 has a motor support structure 13 and a camera mount structure 14. The camera mount structure 14 is mounted on the motor support structure 13 and is rotatable about the first axis A to a plurality of pan positions P, as shown by arrow A1. One of the plurality of pan positions about axis A shall be defined as the pan home position $P_h$.

A camera plate bracket 16 supports a camera 16.2 which is defined to include any protective enclosures 16.3 for the camera. The bracket is mounted on the camera mount 14 and is rotatable about a second axis B through the camera mount structure 14 to a plurality of tilt positions T, as shown by arrow B1. One of the plurality of tilt positions about axis B shall be defined as the tilt home position $T_h$. Axis B is substantially perpendicular to axis A.

A pan motor 18 and a tilt motor 20 are mounted on the motor support structure 13. Pan drive 22 connects the pan motor 18 to the camera mount 14 to cause camera panning about the pan axis A to the plurality of pan positions P.

Tilt drive 24 connects the tilt motor 20 to the camera bracket 16 to cause camera tilting about the tilt axis B to the plurality of tilt positions T.

A pan drive brake 26 holds the camera mount 14 at any of the plurality of pan positions P.

The pan/tilt device 10 further includes tilt home position sensor 30 for sensing the tilt home position $T_h$; camera tilt position sensor 32 for precisely determining camera tilt at one of the plurality of tilt positions T.

The pan/tilt device 10 further includes pan home position sensor 40 for sensing the pan home position $P_h$; camera pan position sensor 42 for precisely determining camera pan at one of the plurality of pan positions P; and camera pan limiter or stop 44 for limiting camera pan. The camera tilt position sensor 32 and pan position sensor 42 are inherent. The stepper motor or encoder when used in conjunction with an appropriate controller.

The pan/tilt device further includes a camera positioning mechanism 18, 20 adapted to automatically position the camera at any of the plurality of tilt positions T and at any of the plurality of pan positions P.

The pan/tilt device 10 also preferably includes a controller 50 for controlling the pan motor 18, tilt motor 20, and camera positioning mechanism 18, 20. Preferably, the controller 50 is a general purpose computer 52, although any comparable device such as a special-purpose controller could also be used.

The controller 50 may be remote from the pan/tilt device 10 as shown in FIG. 5. The controller 50 may communicate with the pan/tilt device 10 over a computer network as shown in FIG. 5. The computer network may be a private network N1 or the computer network may be the Internet N2. For remote operation a local controller 50.2 is necessary for receiving and interpreting the signals from a remote controller.

Preferably, the pan motor 18 is located below the camera mount 14, and the tilt motor 20 is also located below the camera mount 14. In this way, there is no heavy mass (other than the camera) in the camera mount structure, which allows the camera mount structure and thus the camera to be moved quickly from position to position. Another advantage is that if stepper motors are used for the pan motor 18 and tilt motor 20, as will be described below, there is no tendency for the stepper motors to overdrive as a result of acceleration/deceleration of the rotated mass.

Figure 9:
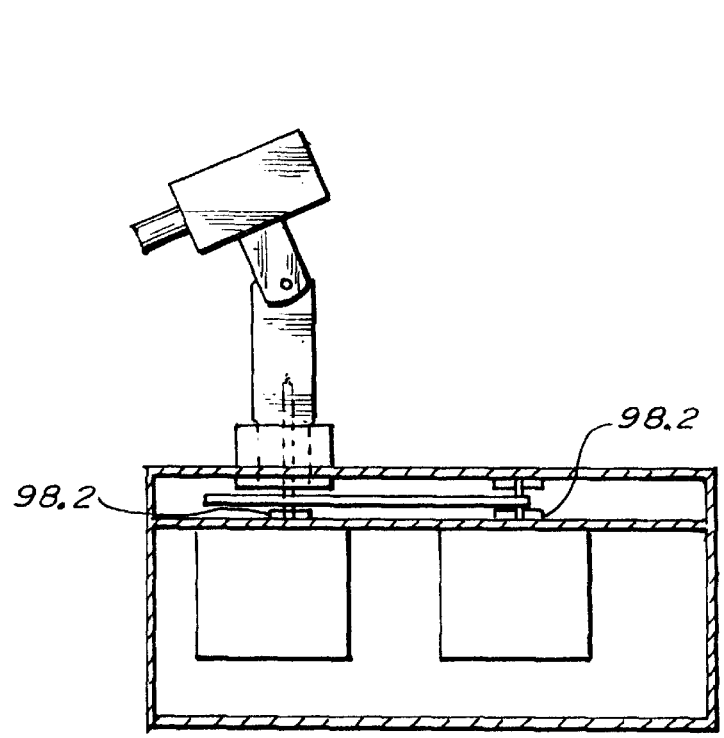
FIG. 9 is a cross-sectional view of an alternative embodiment.
Figure 10:
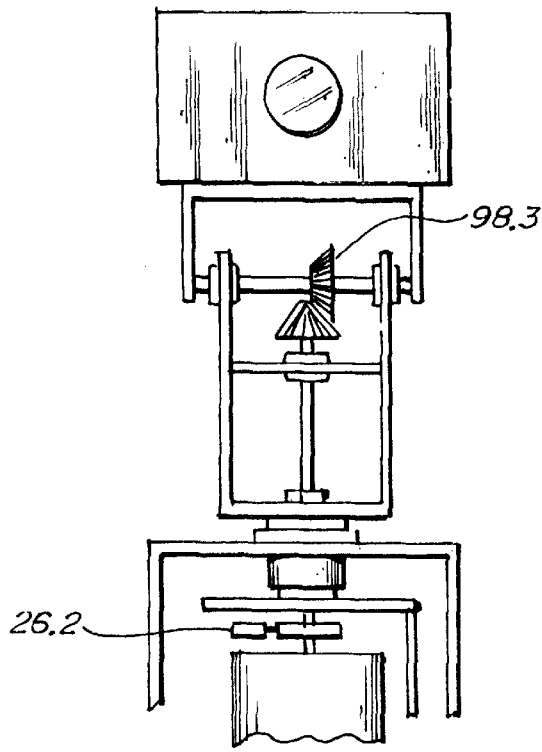
FIG. 10 is an elevational view of an alternative tilt drive mechanism.
Figure 11:
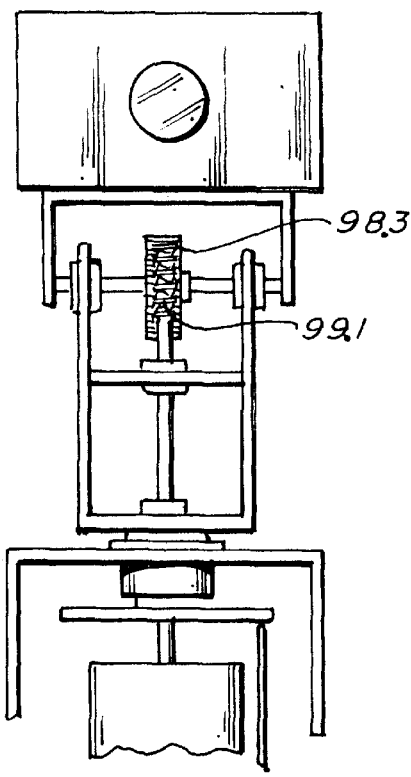
FIG. 11 is an elevational view of an alternative tilt drive mechanism.

Preferably, the pan motor 18 and tilt motor 20 are aligned along the first axis A. This produces a slim configuration for mounting on devices such as towers. Alternate embodiments such as shown in FIGS. 9, 10, 11 also include aspects of the invention.

Figure 6:
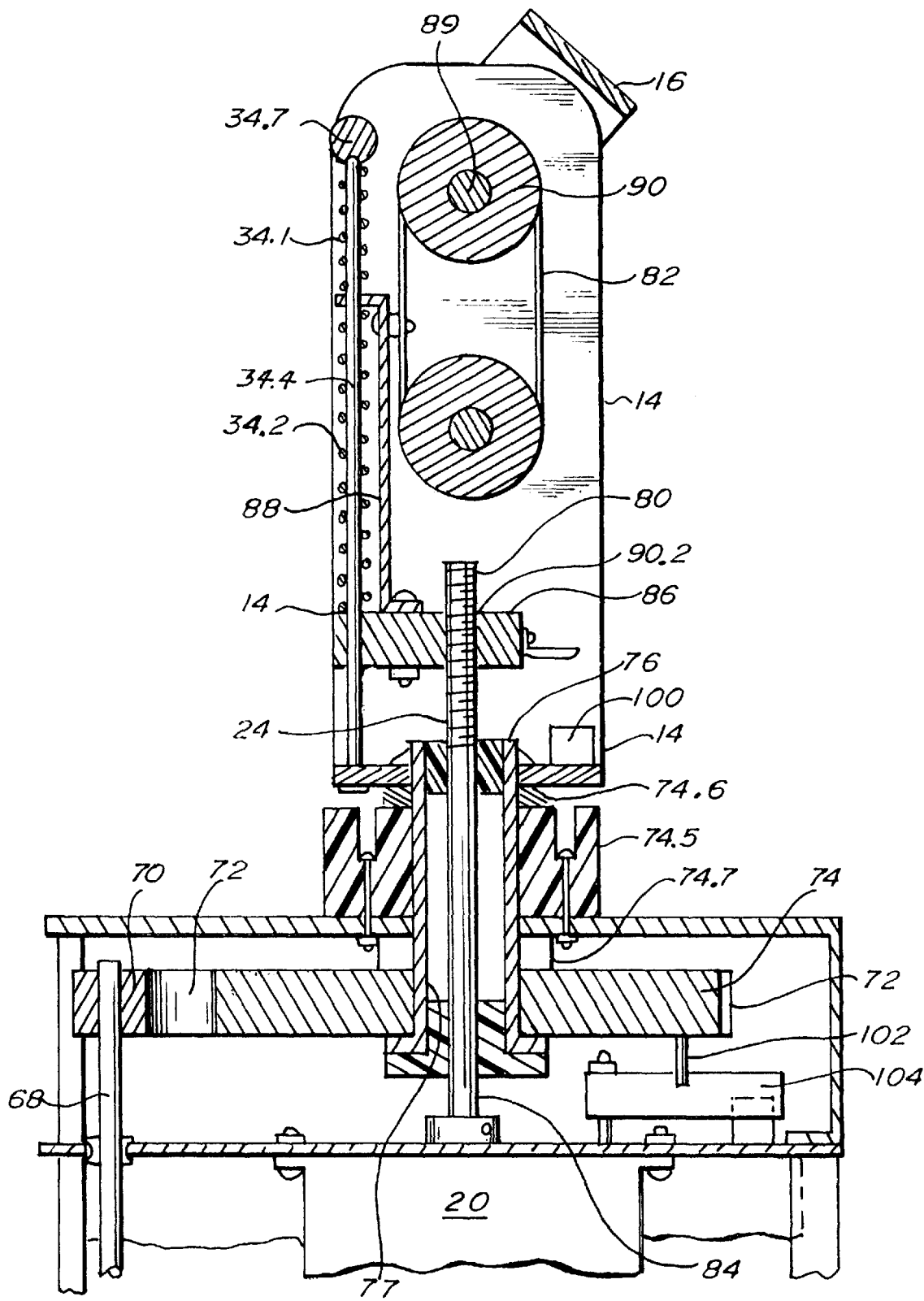
FIG. 6 is a cross-sectional view taken at line 6—6 of FIG. 2.
Figure 7:
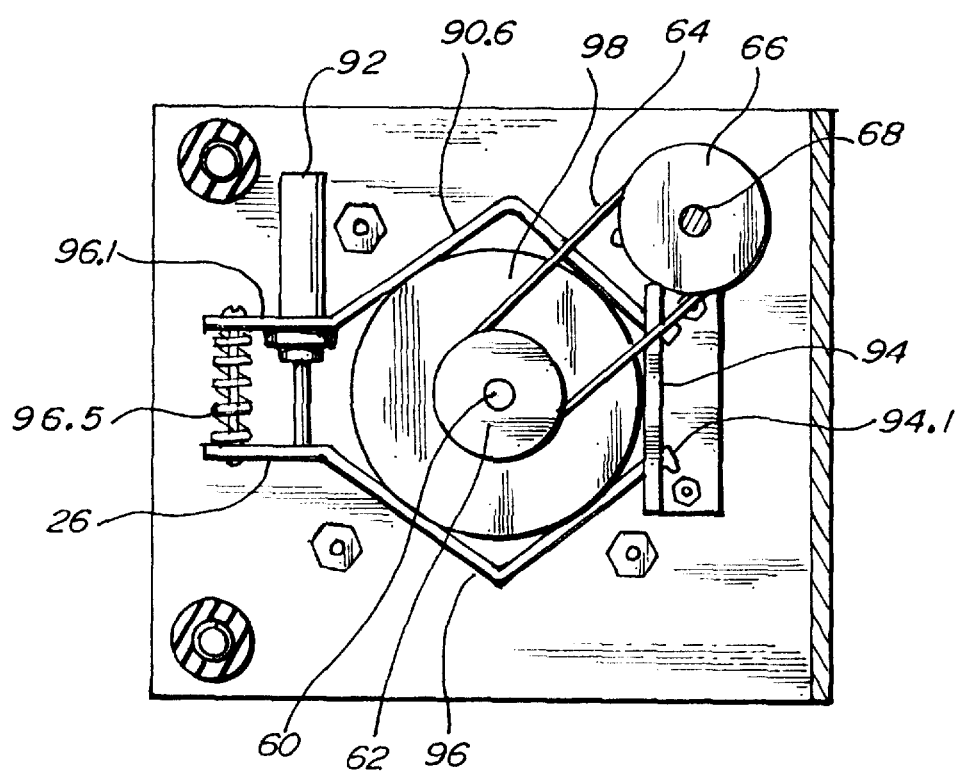
FIG. 7 is a cross-sectional view of a variation of the device of FIG. 1 taken at line 7—7 of FIG. 1.

Referring to FIGS. 3, 6 and 7, details of construction of pan drive 22 and tilt drive 24 are shown. The pan drive 22 as shown comprises a plurality of pulleys and belts. The pan drive 22 may also comprise other mechanical linkages between the pan motor 18 and camera mount structure 14 such as gears. See for example, FIG. 8 where a gear drive 24.5 is depicted. More specifically, pan drive 22 further comprises an output shaft 60 extending from the pan motor 18; a pan drive pulley 62 connected to the pan drive shaft 60; a pan drive belt 64 connecting the pan drive pulley 62 to an intermediate collar drive pulley 66; a collar shaft 68 connected to the collar drive pulley 66; a collar idler pulley 70 connected to the collar shaft 68; an idler belt 72 connecting the collar idler pulley 70 to a pan gear 74; and a pan shaft 76 connecting the pan pulley 74 to the camera mount structure 14. It can be seen that the pan drive 22 thus has a number of driven components spaced from and unaligned with the first axis A. These off-axis drive components discussed above and shown in the figures advantageously mechanically couple the pan motor 18 to the camera mount 14, even though the tilt motor 20 is between the pan motor 18 and the camera mount 14.

The first outer drive shaft 76 is fixed by welding, keys or other suitable means with respect to the pan pulley 74 and the camera mount structure 14. Bearings 74.5, 74.6, 74.7 support and/or guide said drive shaft 76. The bearings are appropriately formed of plastic. The outer drive shaft has a bore 77 extending therethrough.

The tilt drive 24 utilizes an inner drive shaft 84 which is ideally concentric with the first outer drive shaft 76. Preferably, the tilt drive 24 comprises a lead screw 80 and a tilt belt 82 connected between the tilt motor 20 and the camera bracket 16. As is known, a lead screw 80 is capable of providing very fine degrees of movement. When the lead screw 80 is coupled with a stepper motor as will be further discussed, very fine adjustment of the tilt position becomes possible. The tilt belt 82 translates rectilinear motion of the lead screw 80 into rotational motion of the camera plate 16 about axis B.

More specifically, the tilt drive 24 comprises a second inner drive shaft 84 connected to the tilt motor 20; the lead screw 80 connected to or integral with the inner drive shaft 84; a lead nut 86 threadably engaging the lead screw 80; a tilt plate 88 connected to the lead nut 86; the tilt belt 82 connected to the tilt plate 88 and extending around a tubular tilt shaft 89 and pulley 90 and thereafter attaching to a tilt idler gear 92. The tubular tilt pulley 90 is axially rotatable about axis B and the camera bracket 16 is connected to the tilt pulley 90. Rotation of the tilt motor 20 causes the lead nut 86 to turn on the lead screw 80, further causing motion of the tilt belt 82 and tubular tilt pulley 90.

The lead screw and nut assembly provide a self locking mechanism 90.2 and feature which precludes inadvertent tilting of the camera and camera bracket 16 from forces imparted to the bracket 16.

It can be seen from the above description and the figures that the lead nut 86 will rotate not only during camera tilting, but also during pure camera panning. That is, the lead nut 86 is fixed to the camera mount structure at the tilt plate 88 and, as the camera mount structure rotates during panning, the lead nut 86 will also rotate with respect to the lead screw 80. This rotation during camera panning causes corresponding camera tilting. To compensate for this tilt, the pan/tilt device 10 has a correction mechanism incorporated into the controller 50 to offset the tilt. The correction mechanism will cause the tilt motor (which may be a stepper motor as described below) to step slightly to compensate for the rotation of the lead screw as appropriate.

Referring to FIG. 7, a locking mechanism 90.6 for the pan drive is provided by a pan drive brake 26. The brake preferably driven by a solenoid 92. More specifically, shoe bracket 94 is attached to the motor support structure 12 and has bracket slots 94.1 which hold the pan drive brake shoes 96 in a fixed relation with respect to pan drive brake drum 98. Solenoid 92 is attached to one brake shoe 96.1 and when electrically energized bears against the other brake shoe 96.2 to pivot about bracket slots 94.1 to release the brake drum 98, thus allowing the pan drive shaft 60 to rotate and the pan drive to operate. When the rotation stops the solenoid is unenergized and the spring 96.5 pulls the brake shows 96 together to grasp the brake drum 98 and secure the pan drive in the desired position. The solenoid is appropriately energized by the controller 50.

Note that a similar brake 26.2 may be utilized for the tilt drive 24 particularly when the tilt drive utilizes non-self locking gearing or other rotational direction translation mechanisms 98.3 such as is shown in FIG. 10. An alternative to the pulley and drive belt arrangement of FIGS. 2, 3 and 6 is a worm gear arrangement 99.1 of FIG. 11.

The tilt home position sensor 30 for sensing tilt home position further comprises a tilt home flag 30.1 and tilt home flag sensor 30.2 configured as an opto. When the tilt home flag 30.1 interrupts the tilt home flag sensor 30.2, the controller 50 knows that the camera is at the tilt home position $T_h$. Alternatively, the tilt home flag 30.1 may be a hole in the tilt belt 82 through which light 30.3 may pass to enter the tilt home flag sensor 30.2. The home position sensors may be optos, inductive sensors, micro switches or the like.

The camera tilt position sensor 32 for precisely determining camera tilt is preferably a stepper motor 32.1 in cooperation with the controller. Once the tilt home position $T_h$ has been determined as described above, the stepper motor may be used to precisely determine tilt position, in conjunction with the lead screw 80, by counting the number of steps away from tilt home position. Alternatively, the camera position sensors 30, 32 for precisely determining camera tilt and pan position may be an encoder 98.2 (see FIG. 8) which may count the number of revolutions of a drive shaft 84.

Figure 8:
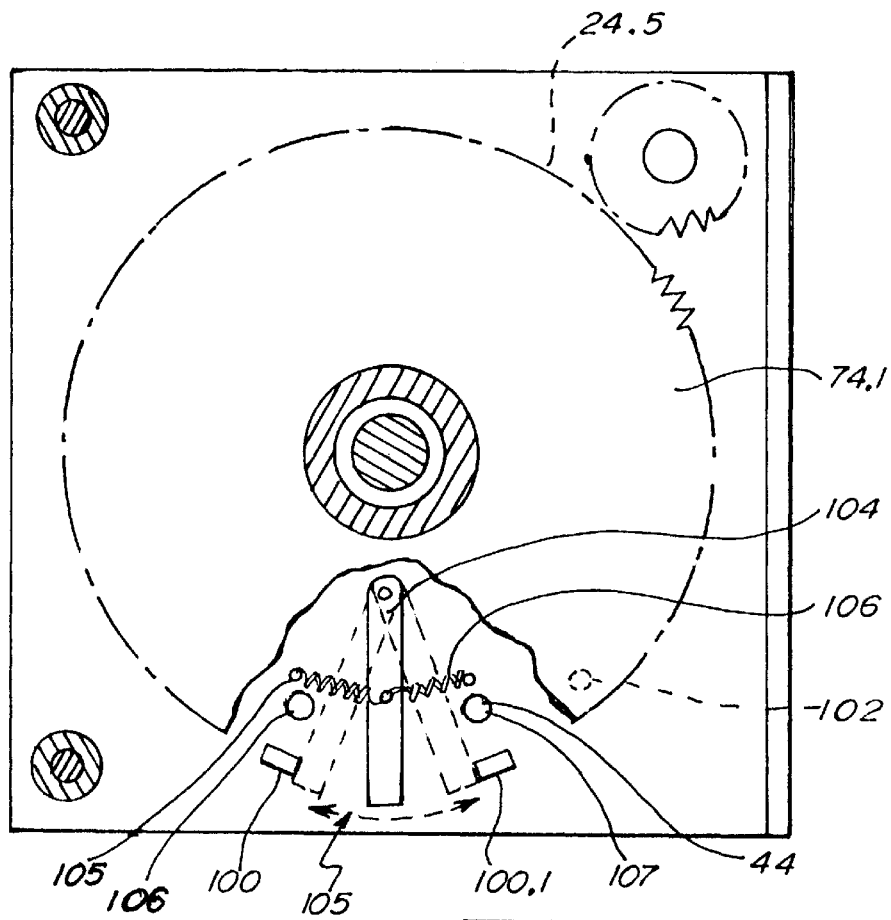
FIG. 8 is a cross-sectional view of a variation of the device of FIG. 1 taken at line 8—8 of FIG. 1.
Figure 8A:
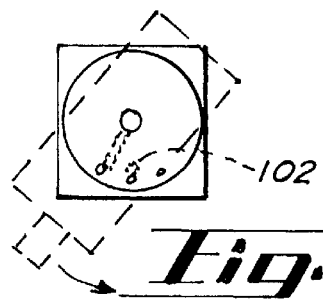
FIGS. 8A, 8B, 8C, and 8D are schematics showing the over rotation mechanism in varying positions.
Figure 8B:
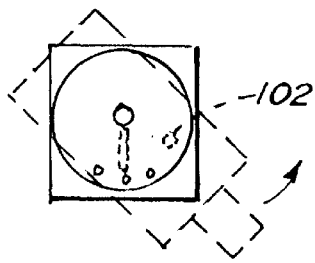
Figure 8C:
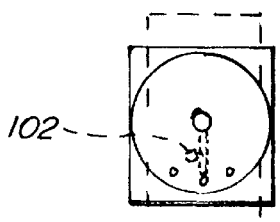
Figure 8D:
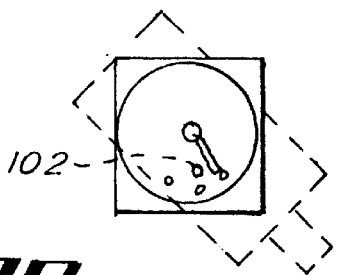

Referring to FIGS. 2 and 8, the pan home position sensor 40 for sensing pan home position is preferably a limit switch 100. Limit switch 100 may advantageously be mounted on the housing 12 near the pan pulley 74, as best seen in FIG. 2. A pan home contact portion 102 configured as a lug 102 is attached to the pan pulley 74, as shown in FIG. 3, or gear 74.1 as shown in FIG. 8. The lug limit switch 100 is positioned in the arc of rotation of the lug 102. The rotation of pan gear 74.1 or pulley 74 to the pan home position causes the pan home lug 102 to engage the limit switch 100, thus signaling pan home position to the controller 50.

The pan home position sensor 40 for sensing pan home position may further comprise a second limit switch 100.1 and a pan home lever 104 mounted on the housing and biased by a pair of limit springs 105, 106 to a position between the limit switch 100 and second limit switch 100.1, as best seen in FIG. 2. As the pan gear 74 rotates, it may reach pan home position by triggering either limit switch 100, 100.1 as the pan home lug 102 presses against the pan home lever 104, forcing the pan home lever 104 against limit switch 100 or limit switch 100.1.

The camera pan limiter 44 for limiting camera pan may advantageously comprise an over rotation device 105 which allows more than 360 degrees of camera pan from the pan home position. That is, if pan home position is signalled by pan home lug closing limit switch 100.1 during clockwise rotation, the limiter 44 should then allow the camera to pan more than 360 degrees in counter-clockwise rotation. This allows the camera operator to view an object which would be just outside the limit of camera panning if the limiter 44 restricted camera panning to 360 degrees. In the preferred embodiment, the limiter 44 is a pair of rotational stop members 106, 107. Counterclockwise rotation of pan gear 74 will allow pan home lug 102 to rotate past rotational stop 106 until it presses pan home lever 104 against rotational stop 107. FIGS. 8A, 8B, 8C, and 8D show schematically the over rotation device 105 with the camera in various pan positions.

The camera pan position sensor 42 for precisely determining camera pan may be a stepper motor 42.1 in conjunction with the controller or an encoder 98.2 as described above for the tilt motor.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A pan/tilt device for a camera, comprising:
   a motor support structure,
   a tilt drive motor and a pan drive motor, both mounted to the motor support structure,
   a first outer drive shaft with a bore extending through said shaft, a second inner drive shaft extending through the outer drive shaft, the drive shafts extending from the motor support structure, the first outer drive shaft mechanically coupled to the pan drive motor, the inner drive shaft mechanically coupled to the tilt drive motor,
   a camera mount structure comprising a main portion and a tilt portion, the camera mount structure supported by and rotatable in a vertical axis with respect to and above said support structure, the camera mount structure mechanically coupled to the first outer drive shaft whereby rotation of first outer drive shaft rotates the camera mount structure, the tilt portion pivotable with respect to the main portion and having a substantially horizontal axis, the inner drive shaft mechanically coupled with the tilt portion whereby rotation of inner drive shaft rotates the tilt portion in a substantially horizontal axis, and
   whereby the tilt portion is pointable by operation of the tilt drive motor and the pan drive motor.

2. The pan/tilt device of claim 1, wherein the tilt drive motor and the pan drive motor are substantially vertically aligned and wherein the tilt drive motor is positioned above the pan drive motor.

3. The pan/tilt device of claim 2, wherein the pan drive motor has an output shaft mechanically coupled to a first vertical shaft, and wherein said first vertical shaft is mechanically coupled to the outer drive shaft.

4. The pan/tilt device of claim 3, wherein the pan drive motor has a brake, the brake biased towards an engagement position for preventing rotation of said shaft.

5. The pan/tilt device of claim 1, wherein the tilt portion is driven by a drive system including a pulley fixed to said tilt portion, a belt engaging said pulley and having a vertically extending portion, a threaded portion on said inner drive shaft, and a drive nut connecting to the vertically extending portion and engaged with the threaded portion, whereby rotation of the inner drive shaft moves said nut substantially vertically thereby moving said vertically extending portion of the belt, and thus pivoting the tilt portion.

6. The pan/tilt device of claim 1, wherein the tilt portion is driven by a rotation translation mechanism having a position locking mechanism.

7. The pan/tilt device of claim 1 further comprising an over rotation mechanism, said mechanism comprising:
   a contact portion which rotates with the camera mount structure and which rotates in a first direction and in a second direction,
   a lever positioned to interfere with the rotation of the contact portion, the lever swingable to allow additional rotation of the contact portion when the lever is contacted by said contact portion whereby the camera mount structure is rotatable more than 360 degrees.

8. The pan/tilt device of claim 1, further comprising a controller for controlling the pan drive motor, the tilt drive motor and for registering tilt positions and pan positions.

9. The pan/tilt device of claim 8, wherein the controller is remote from the pan/tilt device.

10. The pan/tilt device of claim 8, wherein the controller communicates with the pan/tilt device over a computer network.

11. A pan/tilt device for a camera, comprising:
    a support frame having a first axis;
    a camera mount structure rotating about the first axis to a plurality of pan positions, one of the pan positions being a pan home position, the camera mount structure having a second axis and a tilt portion rotating thereabout to a plurality of tilt positions, one of the tilt positions being a tilt home position, the second axis being substantially perpendicular to the first axis;
    a pan motor mounted on the support frame;
    a tilt motor mounted on the support frame; and
    a pan drive connecting the pan motor to the camera mount structure and adapted to cause camera panning about the first axis to the plurality of pan positions, the pan drive having a drive shaft extending from the support frame to the camera mount structure, the tilt drive having a tilt drive shaft extending from the support frame to the camera mount structure, the two drive shafts arranged substantially concentrically.

12. The pan/tilt drive of claim 11, further comprising a controller for controlling the pan drive motor, and the tilt drive motor.

13. The pan/tilt device of claim 12, wherein the controller communicates with the pan/tilt device over a computer network.

14. The pan/tilt device of claim 11, wherein the pan motor and tilt motor are located below the camera mount structure and are substantially aligned along the first axis.

15. The pan/tilt device of claim 11, wherein the tilt drive further comprises a lead screw and a nut connected between the tilt motor and the camera mount structure.

16. A camera positioning device comprising:
    a motor support structure,
    a drive motor mounted to said structure, the motor having an output shaft,
    a camera mount structure rotatably mounted on the motor support structure, the camera mount structure rotatable in a first direction and an opposite second direction,
    a coupling portion connecting the camera mount structure to the output shaft, whereby when the output shaft rotates the camera mount structure rotates,
    an over rotation device comprising:
        a contact portion which moves in a first direction and an opposite second direction as the camera mount structure rotates,
        a pair of stops fixed with respect to the motor support structure, a pivoting lever swingable in a first direction and in a second direction between the two stops, the lever positioned to interfere with and engage the contact portion when said portion is rotating in the first direction and when said portion is rotating in the second direction whereby said camera mount structure is rotatable in excess of 360 degrees.

17. A camera positioning device comprising:

a motor support structure, a drive motor mounted to said structure, the motor having an output shaft, a camera mount structure rotatably mounted on the motor support structure and coupled to the output shaft of the drive motor, and an over rotation device comprising:

a contact portion which rotates with the camera mount structure and which rotates in a first direction and a second direction, a lever positioned to interfere with the rotation of the contact portion, the lever swingable to allow additional rotation of the contact portion when the lever is contacted by said contact portion whereby the camera mount structure is rotatable more than 360 degrees.

18. The device of claim 17, wherein the lever swings in a first swing direction when the contact portion is rotating in the first direction and contacts said contact portion and further the lever swings in a second swing direction when the contact portion is rotating in the second swing direction and contacts said lever.

19. The device of claim 18, further comprising a stop member positioned to limit the swing of the lever.

20. The device of claim 18, further comprising a limit sensor positioned to actuate when said lever swings.

* * * * *